(12) United States Patent
Garth et al.

(10) Patent No.: US 8,477,890 B2
(45) Date of Patent: Jul. 2, 2013

(54) GEOMETRIC DETECTOR FOR COMMUNICATING THROUGH CONSTANT MODULUS (CM) INTERFERERS

(75) Inventors: Lee M. Garth, Andover, MA (US); Gary R. Lomp, Centerport, NY (US); Matthew J. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 187 days.

(21) Appl. No.: 13/056,699

(22) PCT Filed: May 24, 2010

(86) PCT No.: PCT/US2010/035928
§ 371 (c)(1), (2), (4) Date: Jan. 31, 2011

(87) PCT Pub. No.: WO2010/138442
PCT Pub. Date: Dec. 2, 2010

(65) Prior Publication Data
US 2011/0134981 A1 Jun. 9, 2011

Related U.S. Application Data

(60) Provisional application No. 61/181,931, filed on May 28, 2009.

(51) Int. Cl.
*H03D 1/04* (2006.01)
*H04L 27/06* (2006.01)
*H04B 1/10* (2006.01)

(52) U.S. Cl.
USPC ............ 375/346; 375/316; 455/130; 455/296

(58) Field of Classification Search
USPC .................................................. 375/346, 224
See application file for complete search history.

(56) References Cited

U.S. PATENT DOCUMENTS

| | | | |
|---|---|---|---|
| 4,747,160 A | 5/1988 | Bossard | |
| 2002/0045920 A1 | 4/2002 | Thompson | |
| 2004/0001561 A1* | 1/2004 | Dent et al. | 375/308 |
| 2004/0141474 A1 | 7/2004 | Chen | |
| 2006/0018406 A1 | 1/2006 | Chen et al. | |
| 2007/0147486 A1* | 6/2007 | Labs et al. | 375/222 |
| 2008/0279317 A1* | 11/2008 | Lee et al. | 375/346 |

OTHER PUBLICATIONS

Amir Leshem, "Maximum Likelihood Separation of Constant Modulus Signals", Oct. 2000, IEEE Transactions on Signal Processing, vol. 48, No. 10.*

* cited by examiner

*Primary Examiner* — Chieh M Fan
*Assistant Examiner* — Michelle M Koeth
(74) *Attorney, Agent, or Firm* — Leo Zucker; Daniel J. Long (57) ABSTRACT

A desired signal modulated with N symbols is detected in the presence of a constant modulus (CM) interferer that produces M symbols. Observation samples corresponding to the desired signal and the interferer are obtained from a signal recovery stage. N observation constellations are defined, each having M constellation points corresponding to the symbols produced by the interferer, and the points form a circular perimeter of the constellation with a radius corresponding to the strength of the interferer. The perimeter of each constellation is centered on one of N defined symbol points representing the different possible symbols of the desired signal. Distances between the observation samples and the circular perimeter of each observation constellation are determined. For each observation sample, the symbol point on which the constellation perimeter closest to the sample is centered, is selected as a symbol of the desired signal.

23 Claims, 8 Drawing Sheets

GEOMETRIC DETECTOR FOR COMMUNICATING THROUGH CONSTANT MODULUS (CM) INTERFERERS

CROSS REFERENCE TO RELATED APPLICATION

The present application claims priority under 35 U.S.C. Sec. 119(e) of U.S. Provisional Patent Application No. 61/181,931 filed May 28, 2009, which is incorporated herein by reference.

BACKGROUND OF THE INVENTION

1. Field of the Invention

The present invention relates generally to communications receivers, and particularly to a signal detection technique for enabling a receiver to detect desired signals in the presence of jammers or other interferers.

2. Discussion of the Known Art

The rapid growth of modern weapons systems, along with systems used for intelligence and communications, has greatly increased the need for reliable access to the electromagnetic spectrum when carrying out tactical operations. Many sophisticated wireless military communications and jamming systems have recently been disclosed. See, e.g., R. A. Poisel, Modern Communications Jamming Principles and Techniques, Artech House (2004); and O. Holt, Technology survey: Sampling of communications jammers, J. Electronic Defense (February 2008) at pages 43-46, all relevant contents of which are incorporated by reference.

In tactical situations where a number of different radio-frequency (RF) communications systems must be densely deployed, avoidance or reduction of interference among the various systems is paramount if each system is to perform reliably. Enabling the systems to overcome impairments typically caused by spectrum congestion is therefore very important. One known technique being developed for efficient spectrum usage is Dynamic Spectrum Access (DSA) as described in A. N. Mody, et al, Recent advances in cognitive communications, IEEE Comm. Mag., vol. 45, no. 10 (October 2007) at pages 54-61, which are incorporated by reference. Radios using DSA operate to detect, track, and predict the occupancy bands of a potential interferer in time, frequency and space. The radios then shift their operating frequencies accordingly in order to avoid interference.

In certain tactical operations, it is desirable that a blue force "(friendly)" communications system allow soldiers and other friendly users to communicate in the presence of a blue force or friendly jammer that may be operating nearby, for example, to avoid detonation of improvised explosive devices (IEDs) by red force (enemy) cell phones or other wireless devices in enemy hands. The system may be multiplexed with respect to the jammer in time, frequency or space, or other known cancellation techniques may be used to mitigate any adverse effects of the jammer on reception of communications signals by friendly users. See U.S. patent application Ser. No. 12/719,974 filed Mar. 9, 2010, titled "Tactical Radio and Radio Network with Electronic Countermeasures", which issued as U.S. Pat. No. 8,301,075 on Oct. 30, 2012, and is assigned to the assignee of the present application, and is incorporated by reference.

A need remains, however, for a signal processing technique that will enable a receiver or radio to detect desired communications signals in the presence of an interferer without shifting the frequency or timing of the communications signals, or implementing other cancellation techniques that require a high degree of processing power in the receiver.

SUMMARY OF THE INVENTION

According to the invention, a method of detecting a desired signal by a radio or receiver in a communications system, wherein the desired signal is modulated to obtain N possible symbols and is received in the presence of a constant modulus (CM) interferer that produces M possible symbols, includes obtaining successive observation samples from a signal recovery stage in the receiver which samples correspond to the desired signal and the interferer as received simultaneously at the receiver.

N observation constellations are defined, wherein each observation constellation has M constellation points corresponding to the M possible symbols produced by the interferer, and the constellation points define a circular perimeter of the constellation with a radius corresponding to the strength of the interferer. The perimeter of each constellation is centered on a corresponding one of N defined symbol points that represent the possible symbols of the desired signal.

Distances between the observation samples and the perimeter of each observation constellation are determined. For each observation sample, the symbol point on which the perimeter closest to the sample is centered, is selected as a symbol of the desired signal.

The inventive method is effective to cancel or reduce the effects of interferers or jammers that transmit phase shift keyed (PSK) signals, frequency shift keyed (FSK) signals, or any other kind of radio signal whose amplitude or envelope remains constant over time.

For a better understanding of the invention, reference is made to the following description taken in conjunction with the accompanying drawing and the appended claims.

DETAILED DESCRIPTION OF THE INVENTION

The inventive signal processing technique allows a blue force or friendly communications radio or receiver to operate reliably in the presence of constant modulus (CM) jammers or interferers, whether or not friendly, and whether the interference is intentional or unintentional. As used herein, "constant modulus" or CM signals include phase shift keyed (PSK), frequency shift keyed (FSK), or other frequency modulated (FM) or phase modulated (PM) radio signals the amplitude or envelope of which remain constant over time. Thus, nonlinear class C or class D radio frequency (RF) power amplifiers are typically used to transmit CM signals efficiently at high levels of power.

According to the invention, if a CM signal capable of producing M possible symbols is detected or estimated by a receiver in a communications system in which desired communications signals are modulated to produce N possible symbols, then N observation constellations are defined mathematically with respect to a complex plane. Each observation constellation has a circular perimeter defined by M constellation points, wherein each point represents a different one of the M possible symbols produced by the interferer. Each observation constellation has a radius that corresponds to the strength of the interferer, and is centered on one of N defined symbol points each of which represents one of the N possible symbols of the desired signal.

A signal recovery stage in the receiver is operative to output successive composite observation samples that correspond to the desired signal and the interferer as received simultaneously at the receiver. The samples may be in the form of, for example, in-phase/quadrature (I/Q) signal samples which are produced by an intermediate frequency (IF) stage of the kind typically provided in communications receivers. The distance between each observation point and the perimeter of each of the observation constellations is determined, and the constellation perimeter that is closest to the observation point is identified. For each observation point, the symbol point on which the closest perimeter is centered, is selected as a symbol of the desired signal.

Accordingly, the observation points are equivalent to samples of a complex baseband version of the received composite signal. As such, the distribution of the received samples is relevant to the identification and exploitation of the interference, and to the detection of the underlying desired signal. By definition, for a constant modulus (CM) interferer or jammer, samples of the jamming signal will lie on a circle constructed mathematically in a complex (IQ) plane wherein the radius of the circle is proportional to the amplitude of the received jamming signal. The constellation of the desired signal comprises a finite set of points in the IQ plane which correspond to possible data or symbol values according to a known code. Thus, the composite (desired signal plus jammer) sample lies on a circle whose center is at that point in the IQ plane which corresponds to the data or symbol value of the desired signal within the received sample.

The symbol constellation for the desired signal is therefore transformed by the addition of the jammer into a number of circular constellations that may overlap with one another, in which case the overlapping regions define sets of "ambiguity points" each of which cannot be mapped uniquely to one constellation point of the desired signal whereas points in the non-overlapping regions can be so mapped.

The inventive technique is illustrated below with respect to the detection of a binary phase shift keyed (BPSK) communications signal (N=2) in the presence of a 16-PSK jammer signal (M=16). Those skilled in the art will understand that the invention is not so limited and may also be applied to recover desired communications signals that employ higher order (N>2) modulation schemes, and in the presence of CM interferers where M is greater or less than 16.

Observation Model

Consider, for example, the scenario of a BPSK communications signal that is received in the presence of a CM interferer, wherein the interferer is transmitting a M-PSK signal with random equiprobable symbols. If a radio that receives both signals simultaneously samples the combined signals at the symbol rate of the communications signal, the received complex baseband observations or samples may be expressed as $$y_k = s_k + i_k + n_k \quad \text{(Eq. 1)}$$

wherein $s_k$ is the BPSK signal with equiprobable symbols $\pm 1$, interferer $i_k$ is a M-PSK signal with equiprobable symbols taken from $\{\beta_l = R \exp(-j2\pi l/M): l = \{0, \ldots, M-1\}\}$, and $n_k$ is additive zero-mean white complex Gaussian noise with variance $P_n = \sigma^2_n$. The power of the interferer is then $P_i = R^2$.

Figure 1:
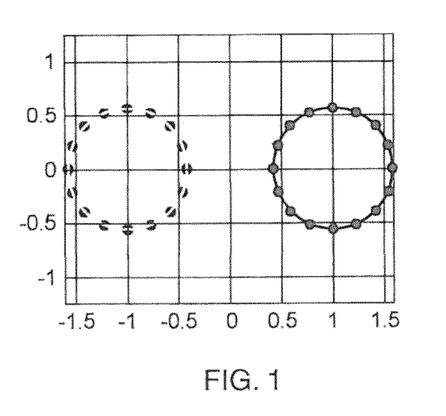
FIG. 1 a channel output constellation with a jammer to signal ratio (JSR) of −5 dB.
Figure 2:
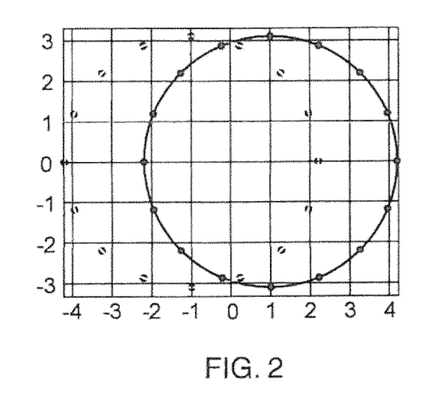
FIG. 2 is a channel output constellation with a JSR of 10 dB.
Figure 3:
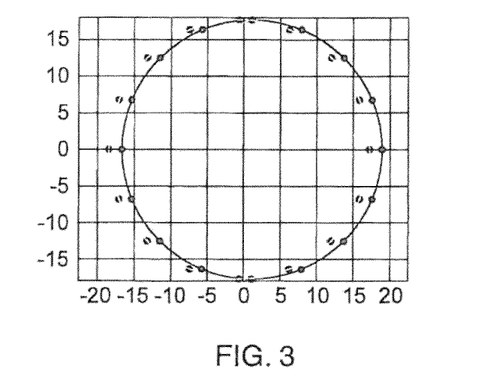
FIG. 3 is a channel output constellation with a JSR of 25 dB.

The relationship of the three components in Eq. 1, may be represented by the use of a superimposed signal-plus-interference-plus-noise symbol constellation. FIGS. 1 to 3 each show pairs of such constellations for small, medium, and large jammer-to-signal ratios (JSRs) at the receiver, wherein the CM interferer signal produces a symbol constellation of 16 constellation points which define a circular perimeter for the constellation. FIG. 1 illustrates a pair of constellations that are defined at the receiver when the received JSR is −5 dB and the signal-to-noise ratio (SNR) is 30 dB. In FIG. 2, the received JSR is 10 dB and the SNR is 30 dB; and in FIG. 3, the JSR is 25 dB and the SNR is 30 dB.

Specifically, the left constellation of each pair of constellations in FIGS. 1 to 3 is centered on a symbol point on the real axis that represents a value of $s_k = -1$ for the desired BPSK communications signal, and the right constellation of each pair is centered on a symbol point on the real axis that represents a value of $s_k = +1$ for the desired signal. The radius of each constellation is scaled in FIGS. 1 to 3 as a function of the JSR or relative strength of the interferer signal at the receiver. A ball at each observation point is sized according to the noise variance $\sigma^2_n$.

For a relatively small JSR as shown in FIG. 1, the constellations do not overlap or cross the imaginary (vertical) axis. Thus, all constellation points corresponding to $s_k = +1$ remain in the right half plane (RHP), and all constellation points corresponding to $s_k = -1$ remain in the left half plane (LHP).

For a medium JSR as in FIG. 2, the constellations partially overlap and cross the imaginary axis, but are still quite distinct. Some of the constellation points corresponding to $s_k=+1$ are now in the LHP, however.

Finally, for a large JSR (FIG. 3), it becomes more difficult to distinguish between the two constellations as the offset distance between the centers of the constellations becomes small relative to the length of their radii of 18 in FIG. 3. In this case, approximately half of the superimposed constellation points corresponding to $s_k=+1$ are now in the LHP.

Figure 4:
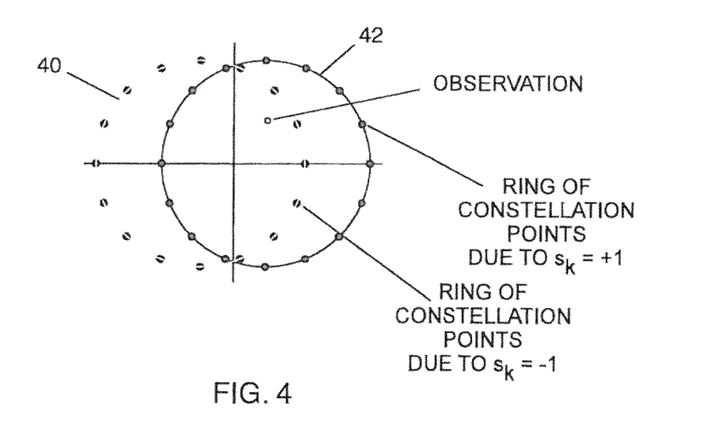
FIG. 4 is an observation constellation diagram.

For each recovered observation $y_k$ in Eq. (1), a corresponding signal value of either $s_k=+1$ or $s_k=-1$ must be chosen. That is, in FIG. 4, for each observation point $y_k$ it must be determined to which of the constellation points on the left observation constellation 40 or the right observation constellation 42 in FIG. 4 does $y_k$ correspond.

The Sign Detector

Figure 5:
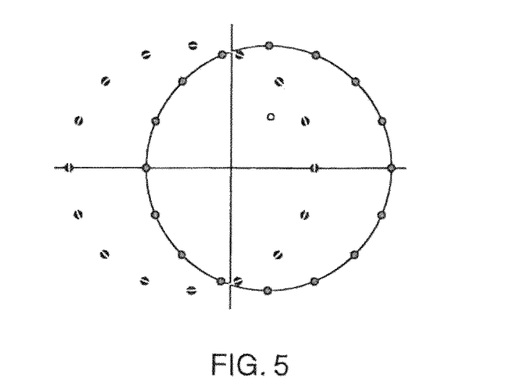
FIG. 5 is an observation constellation diagram illustrating operation of a sign detector.

It is known that an optimal coherent detector for a BPSK signal in additive white Gaussian noise (and without an interferer) is a sign detector. A sign detector simply determines that $s_k=+1$ if the observation point $y_k$ is in the RHP and determines that $s_k=-1$ if $y_k$ is in the LHP. For example, as shown in FIG. 5, since the observation point is in the RHP, it is mapped to $s_k=+1$. If no interferer is present, the detection error probability (i.e., the probability of decoding $s_k=+1$, when $s_k=-1$ was transmitted) has the following form as described in S. Haykin, Communication Systems, John Wiley & Sons (4th ed. 2001), all relevant contents of which are incorporated by reference:

$$P_e^{BPSK} = \frac{1}{2}\text{erfc}\left(\sqrt{\frac{P_s}{P_n}}\right) \quad \text{(Eq. 2)}$$

where $P_s$ and $P_n$ are the signal and the noise powers, and complementary Gaussian error function $$\text{erfc}(x) = \frac{2}{\sqrt{\pi}}\int_x^\infty \exp(-z^2)dz \quad \text{(Eq. 3)}$$

When communicating through a jamming environment in which a M-PSK interferer is present, the detection error probability for the sign detector may be extended to the form $$P_e^{sign} = \frac{1}{2M}\sum_{\ell=0}^{M-1}\text{erfc}\left(\frac{\sqrt{P_s}+\text{real}(\beta_\ell)}{\sqrt{P_n}}\right) \quad \text{(Eq. 4)}$$

The sign detector is compared later below to three other detectors disclosed herein, using Monte Carlo simulations and the closed-form expression of Eq. 4.

The Inventive Circle Detector

Figure 6:
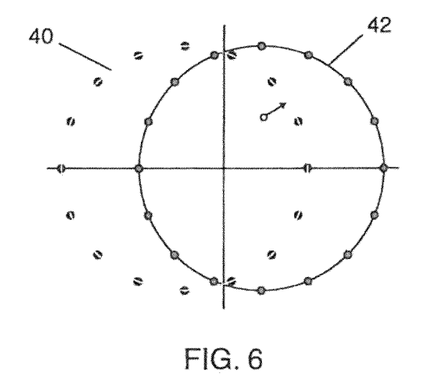
FIG. 6 is an observation constellation diagram illustrating operation of a circle detector according to the invention.

The above sign detector operates by ignoring the presence of the interferer when determining $s_k$. As seen in the constellation diagram in FIG. 4, however, all the constellation points on the right circle 42 correspond to $s_k=+1$, and the points on the left circle 40 correspond to $s_k=-1$. As shown in FIG. 6, the inventive circle detector associates each recovered observation or sample $y_k$ with the nearest circular perimeter for each observation constellation, in this case the left circle 40 which is centered on the symbol point $s_k=-1$. The circle detector takes advantage of the CM property of the interferer signal by choosing $s_k=+1$ if $y_k$ is closer to the right circle 42, and choosing $s_k=-1$ if $y_k$ is closer to the left circle 40. Note the probability of a recovered observation point $y_k$ being equidistant from both of the circles 40, 42 is zero.

The Euclidean distance from an observation point $y_k$ to a circle of radius R centered at a point c, has the form $$d(y_k,R,c)=|R-|y_k-c|| \quad \text{(Eq. 5)}$$

where the inner absolute value is a complex operation and the outer absolute value is real.

To derive an analytical approximation for the detection error probability, a common approximation is used by considering only the nearest neighbor constellation points under the alternative cases of $s_k=\pm 1$. (See S. Haykin, cited above). In such case, consider the distance from a particular constellation point (e.g., on circle 42) to the nearest point on the circle corresponding to the other hypothesis (i.e., on circle 40). In particular, if we define $$d_\ell=d(\beta_\ell\cdot 1)\cdot\sqrt{P_i}=R\cdot 1), \text{ for } f=0,\ldots,M-1 \quad \text{(Eq. 6)}$$

Then $$P_e^{circle} \approx \frac{1}{2M}\sum_{\ell=0}^{M-1}\text{erfc}\left(\frac{d_\ell}{2\sqrt{P_n}}\right) \quad \text{(Eq. 7)}$$

The circle detector is also compared below with the other detectors disclosed herein, using Monte Carlo simulations and the analytical expression of Eq. 7.

A Pie/SIC Detector

Using a known successive interference cancellation (SIC) detection approach, if the interferer signal is strong, one should be able to obtain a good estimate $i_k$ of the signal, and then subtract the estimate $i_k$ from $y_k$, leaving $$y'_k=y_k-\hat{i}_k \approx s_k+n_k \quad \text{(Eq. 8)}$$

which is then passed through the sign detector which is optimal for a BPSK signal in additive white Gaussian noise, as described above.

Figure 7:
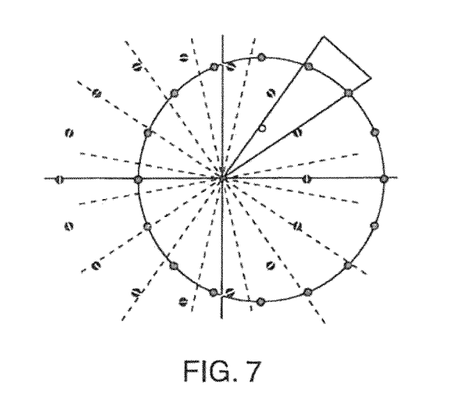
FIG. 7 is an observation constellation diagram illustrating operation of a Pie/SIC detector.

To estimate the symbols of a coherently demodulated M-PSK interferer (without the communications signal), the complex plane is divided into wedges like a pie as shown in FIG. 7. If the observation $y_k$ lies in the same wedge as an interferer constellation point $\beta_j$, then set $i_k=\beta_j$. The interferer estimator may then be written as $$\hat{\beta}(y_k) = R\exp\left(j\frac{2\pi}{M}\left\lfloor\frac{M}{2\pi}\angle y_k + \frac{1}{2}\right\rfloor\right) \quad \text{(Eq. 9)}$$

where $\angle y_k$ represents the phase angle of $y_k$. The floor function in Eq. 9 in effect quantizes the angle of $y_k$ to that of the nearest interferer constellation, point. Then, if $y_k-\beta(y_k)$ is in the RHP, choose $s_k=+1$; and if $y_k-\beta(y_k)$ is in the LHP, choose $s_k=-1$.

To derive a closed-form expression for the detection error probability, the nearest neighbor approximation is used again. For example, if we define $$\delta_\ell=\hat{\beta}(\beta_\ell+1) \quad \text{(Eq. 10)}$$

then the detection error probability is approximately $$P_e^{pie} \approx \frac{1}{2M} \sum_{\ell=0}^{M-1} \text{erfc}\left(\frac{\sqrt{P_s} + \text{real}(\beta_\ell) - \text{real}(\delta_\ell)}{\sqrt{P_n}}\right) \quad \text{(Eq. 11)}$$

The SIC or "pie" detector is compared below to the other detectors disclosed herein, using Monte Carlo simulations and the analytical expression of Eq. 11.

An Optimal Multi-User Detector

Figure 8:
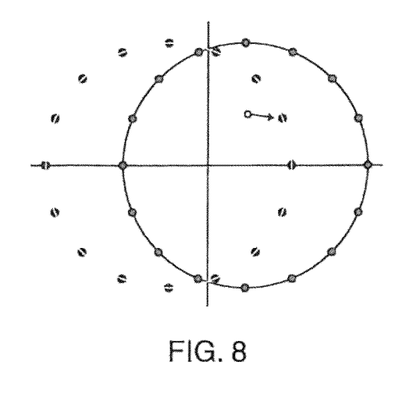
FIG. 8 is an observation constellation diagram illustrating operation of a multi-user (MU) detector.

An "optimal" multi-user (MU) detector is configured to map an observation point $y_k$ to the nearest point in a superimposed signal-plus-interferer symbol constellation, as shown in FIG. 8. Thus, symbols modulated on both the communications signal and the interferer signal are decoded at the same time. A brute force method to determine the nearest constellation point requires calculating 2M Euclidean norms for each received observation, wherein M is the number of different symbols on the interferer constellation. This requires appreciably more processing power than that needed for the detectors described above.

An equivalent implementation of the MU detector may, however, be as follows. First, the phase angle of the observation is quantized relative to circles centered at each communications symbol point using, for example, an offseted version of Eq. 9. This yields a set containing the nearest points on each circle to the received sample. The Euclidean distances from the received sample to each point in the set are then calculated, and the closest constellation point is selected. Such a method thus requires far fewer calculations than the above brute force method.

To derive an analytical approximation for the detection error probability for the MU detector, the nearest neighbor approximation is again used. For each constellation point on one of the circles, the nearest neighbor constellation point on the other circle is determined. The nearest neighbor to $\beta_j - 1$ may be expressed as $$\beta_j^{NN} = \arg\min_{\beta_k, k=0 \ldots M-1} |\beta_k + 1 - (\beta_j - 1)|. \quad \text{(Eq. 12)}$$

for $j = 0, \ldots, M-1$

Then, the MU detection error probability is approximately $$P_e^{MU} \approx \frac{1}{2M} \sum_{\ell=0}^{M-1} \text{erfc}\left(\frac{|\beta_\ell - 1 - (\beta_\ell^{NN} + 1)|}{2\sqrt{P_n}}\right) \quad \text{(Eq. 13)}$$

Computational Complexity Comparison

As mentioned, the detectors disclosed herein may be easily generalized to the case of an N-QAM communications signal. The computational complexity of each of the four detectors for this more general case is discussed below.

The sign detector, which is optimal in the absence of an interferer signal, quantizes the complex received samples based upon the shape and size of the N-point signal constellation. For example, for a QAM constellation with symbols lying on a rectangular grid, the quantization occurs along the in-phase and the quadrature dimensions.

The circle detector requires N Euclidean distance calculations to determine the closest of the N circles (one for each possible communications symbol) to the received sample. The pie detector is comprised of the M-point interferer phase quantizer followed by the N-point communications signal quantizer of the first detector. Finally, the MU detector involves N, M-point interferer phase quantization operations, followed by N Euclidean norms.

Simulation Results

Figure 9:
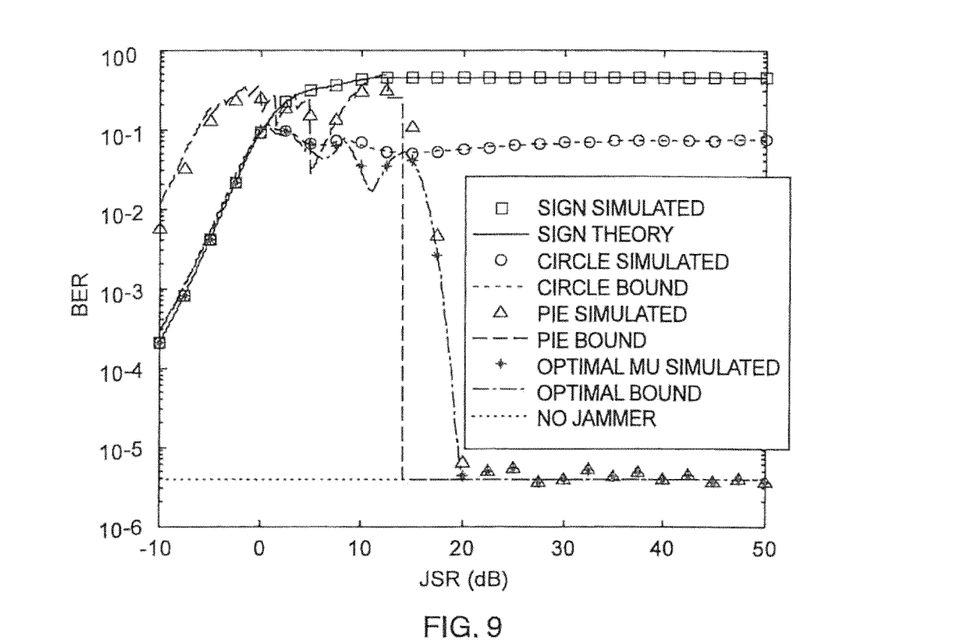
FIG. 9 is a graph illustrating performance of the detectors in the presence of a 16-PSK jammer signal.

Monte Carlo simulations were run for all four detectors, fixing the SNR to 10 dB while varying the JSR from −10 dB to 50 dB. The simulation and analytical results for a 16-PSK interferer are shown in FIG. 9. Note that the analytical expressions for the detection error probabilities line up well with the simulation points, except for the upper transition region of the pie detector. The dotted line shows the bit error rate (BER) for the case of a BPSK communications signal with no interferer, which is the upper bound on the potential performance (or the lower bound of the BER) of a BPSK communications system when operating in the presence of an interferer or jammer.

The sign detector, which ignores the presence of the interferer in the observations, performs well for small JSRs (below 0 dB) but starts to perform badly as the JSR increases, quickly hitting a worst case BER of 0.5. The latter case occurs when the large circles are distributed almost equally over the RHP and the LHP as in FIG. 3.

The circle detector performs almost as well as the MU detector for small to medium JSRs, but levels off for large JSRs where it lacks the ability to estimate the phase of the interferer accurately. For the detector to perform well, the contours under the different signal hypotheses must be quite distinct in terms of Euclidean measure. In FIG. 3, note that for large radius circles, the distinction between the two circles becomes proportionally smaller.

The pie/SIC detector performs poorly for small to medium JSRs where the communications signal component is large relative to the interferer component. For large JSRs, the interferer estimator enables the pie/SIC detector to perform as well as the MU detector. Note that for large JSRs, both the pie/SIC and the MU detectors perform as well as the BPSK communications system without an interferer.

Finally, the MU detector performs extremely well for large JSRs. This follows the known result that a MU detector will operate better to separate two signals if one of the signals (i.e., the interferer) is much stronger than the other (i.e., the communications signal).

Figure 10:
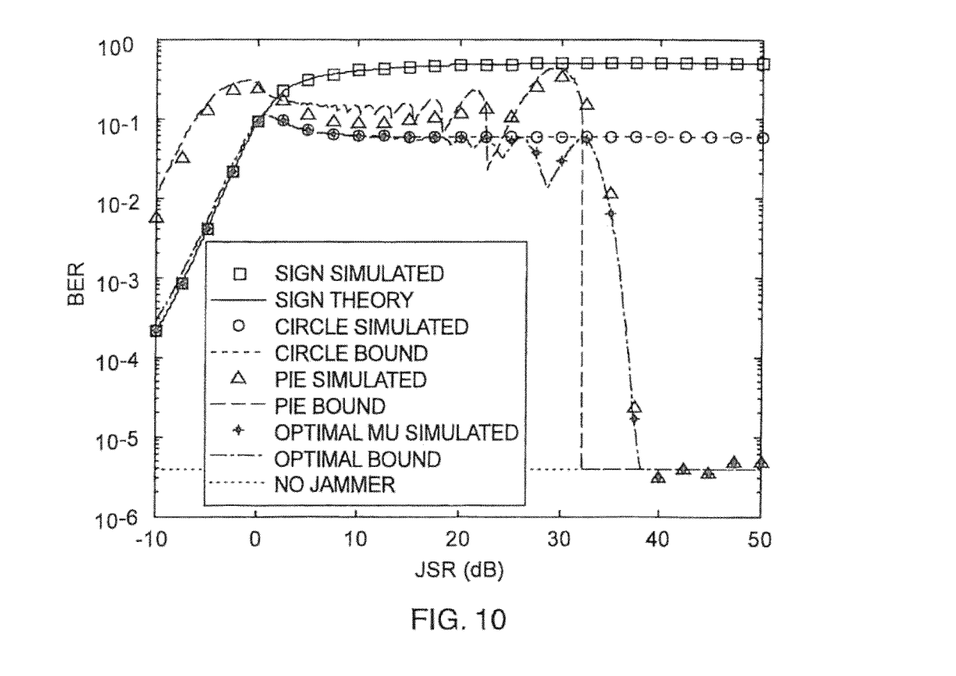
FIG. 10 is a graph illustrating performance of the detectors in the presence of 128-PSK jammer signal.

The case of a 128-PSK interferer was also considered, and the results are shown in FIG. 10. Note that the sign and the circle detectors perform about the same as they did for a 16-PSK interferer. The pie/SIC and the MU detectors perform worse at medium JSRs, however, with a transition to almost perfect interferer cancellation occurring at higher JSR values than for the 16-PSK interferer. In this case the interferer phase is much harder to estimate.

The foregoing assumes an idealized case where the communications signal and the interferer have identical carrier frequencies, symbol rates, and time delays. These assumptions may not hold in practice, however.

First, consider the effect of introducing a carrier frequency offset between the interferer and the communications signals. To do so, instead of considering only symbol constellation points, modulation and demodulation blocks are implemented. Specifically, raised-cosine pulseshaping filters with 100% excess bandwidth were introduced for both the interferer and the communications signals, the symbol rate for both signals was set to 6 ksymbols/sec, and an oversampling rate of seven was used.

Figure 11:
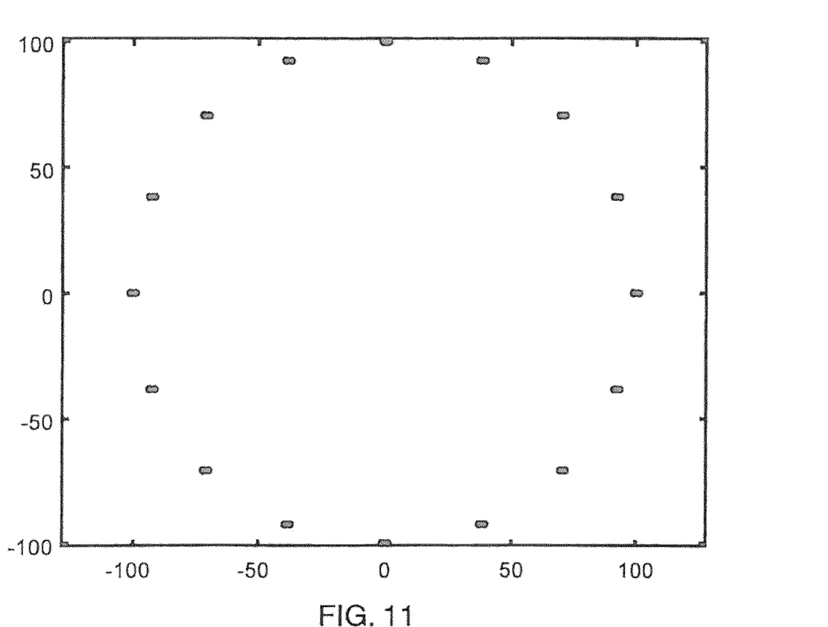
FIG. 11 is a symbol constellation representative of a communications signal and an interferer operating simultaneously with identical carrier frequencies, symbol rates, and time delays.
Figure 12:
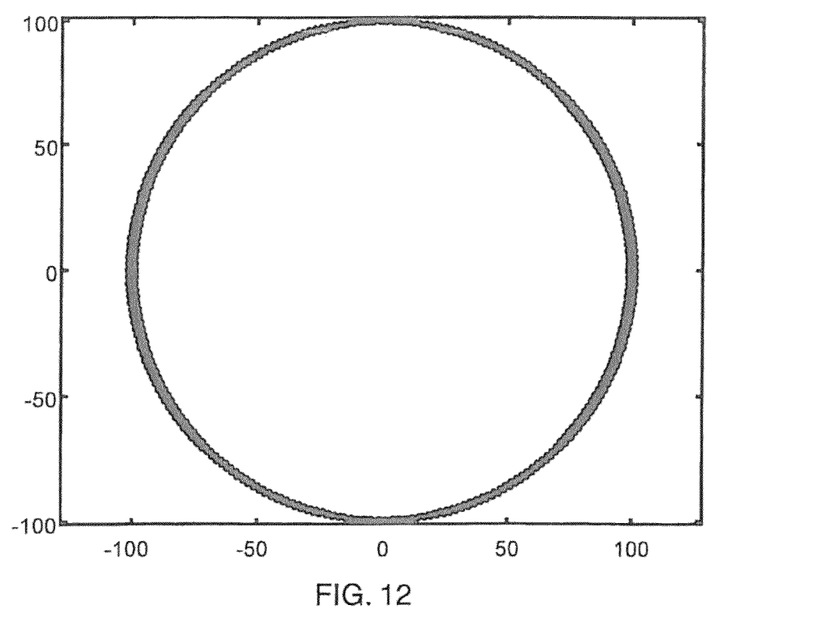
FIG. 12 is a symbol constellation as in FIG. 11, with a carrier frequency offset between the communications signal and the interferer.
Figure 13:
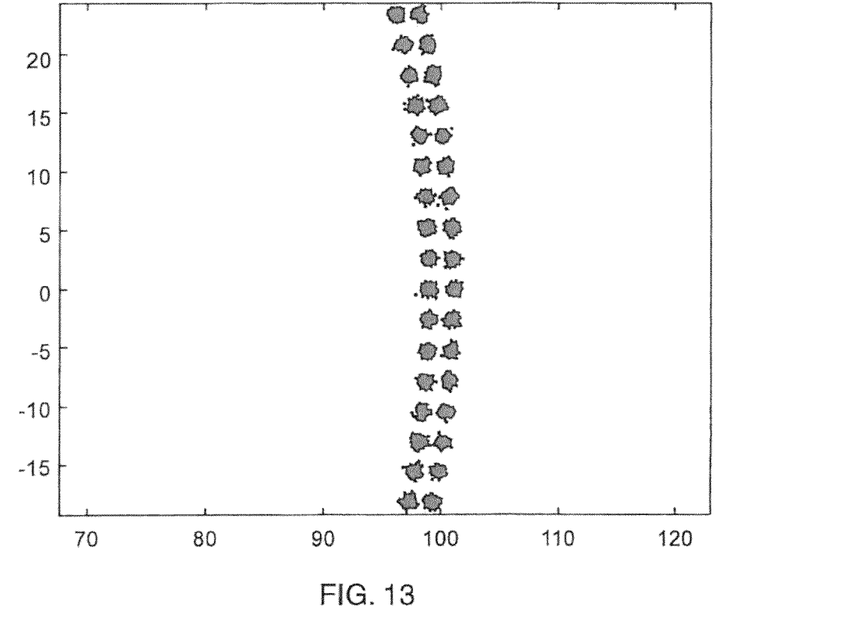
FIG. 13 is an enlarged view of a portion of the symbol constellation in FIG. 12.

The carrier frequency of both systems was initially set to 10 kHz, yielding the observation constellation shown in FIG. 11 in which 16 pairs of dots are evenly spread around a circle. A carrier frequency offset was then introduced by changing the interferer carrier frequency to 9.9 kHz, producing the observation constellation shown in FIG. 12. The effect of the offset is that the constellation points are spun around the origin, in effect filling in the circle. But, by zooming into a portion of the constellation, we see in FIG. 13 that the pairs of points remain distinct and on two separate circles.

Figure 14:
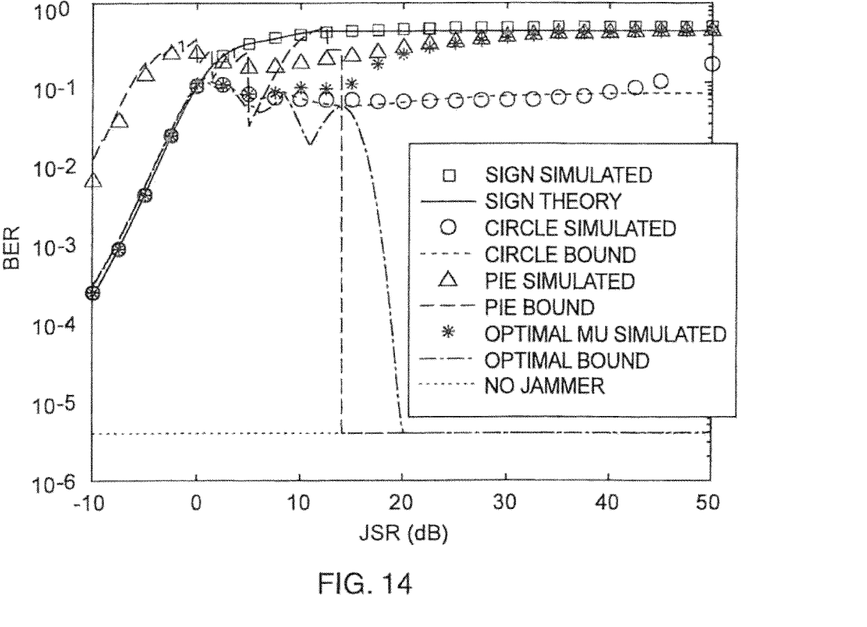
FIG. 14 is a graph illustrating performance of the detectors with a carrier frequency offset between the communications signal and the interferer.

BER simulations were also run for the four detectors, without modifying them to account for the slight frequency offset. In FIG. 14, note that the pie/SIC and the MU detectors perform much worse than in FIG. 9. But because the circle detector is independent of the phase of the interferer, it generally maintains the same performance as before and outperforms both the pie and the MU detectors for large JSRs, thus demonstrating its robustness to carrier frequency offsets.

Figure 15:
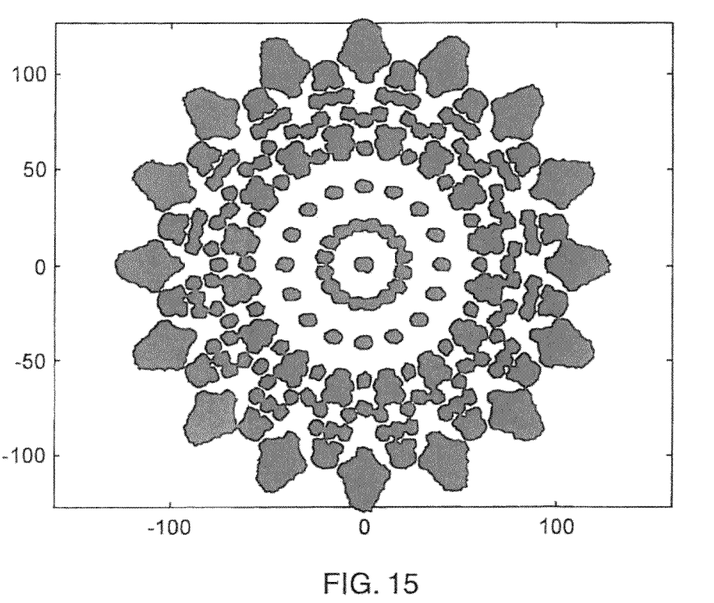
FIG. 15 is a symbol constellation as in FIG. 11, wherein the symbol rate of the communications signal is 6 ksymbols/sec, and the symbol rate of the interferer is 5 ksymbols/sec.
Figure 16:
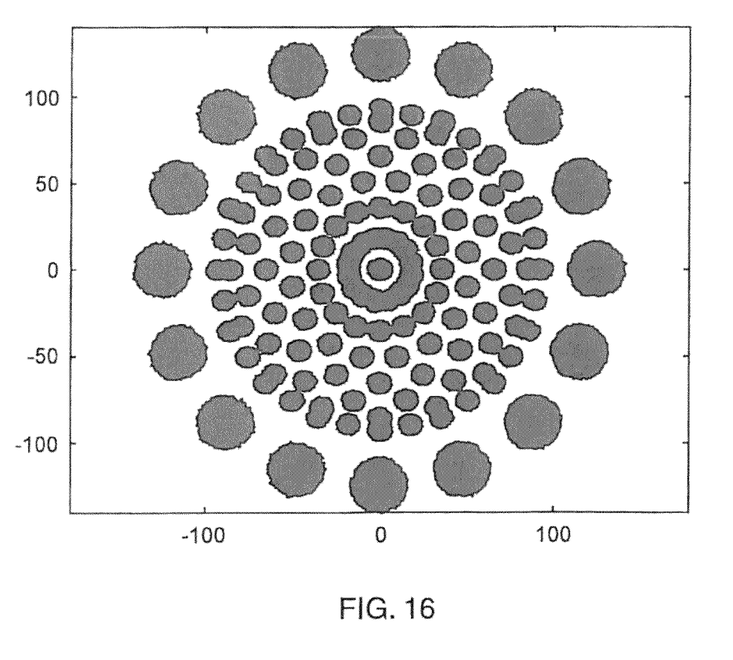
FIG. 16 is a symbol constellation as in FIG. 15, wherein the symbol rate of the interferer is 3 ksymbols/sec.
Figure 17:
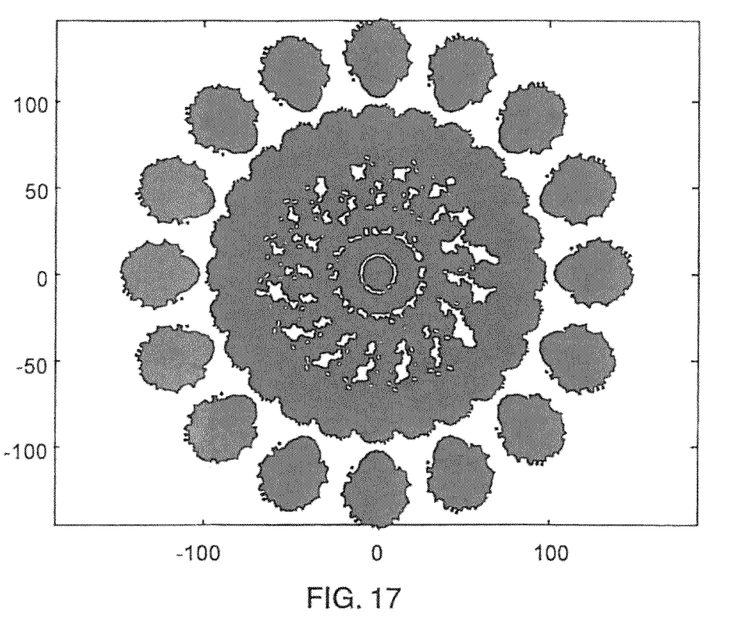
FIG. 17 is a symbol constellation as in FIG. 15, wherein the symbol rate of the interferer is 1 ksymbols/sec.

Setting both carrier frequencies again to 10 kHz, the effect of reducing the symbol rate of the interferer relative to the communications signal was also considered. FIGS. 15 to 17 show output symbol constellations for interferer symbol rates of five, three and one ksymbols/sec, respectively.

Figure 18:
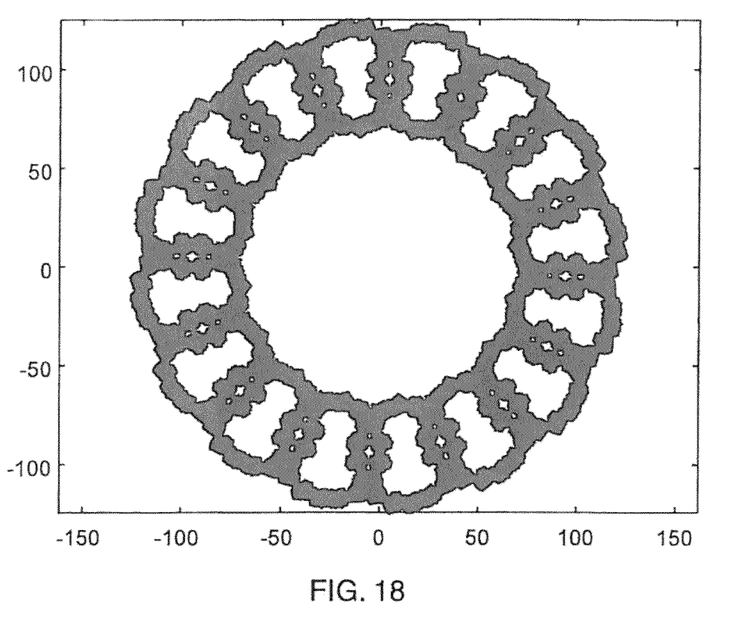
FIG. 18 is a symbol constellation as in FIG. 15, with a time delay of two samples between the communications signal and the interferer.

Finally, the carrier frequency and the symbol rate of the communications signal and the interferer were set identical, and the effect of a time delay between the interferer and the communications signal was considered. FIG. 18 shows the symbol constellation when the time delay was set to two samples for an oversampling rate of seven.

By exploiting the CM property of a jammer or other interfering signal, the inventive circle detector reduces the computational complexity of the signal processing needed to suppress the interference while maintaining good BER performance. For small to medium JSRs, the circle detector is preferred, while the pie/SIC detector may be preferable for large JSRs. Both the circle and the pie/SIC detectors provide excellent performance with reduced complexity compared to the MU detector. Further, the inventive circle detector outperforms the more complex pie/SIC and MU detectors when a carrier frequency offset is present between the interferer and the desired communications signal.

For the receiver to exploit the CM property of the interferer optimally, the combined communications and interferer signals should be subjected to as little filtering as possible-prior to obtaining the observation samples $y_k$ in the receiver. The front end of the receiver should preferably pass the desired and the interferer (jammer) signal faithfully up to the point of excision of the jammer. This entails maintaining adequate linearity and dynamic range. The excision may be performed in a wideband domain, before any reduction of the received samples to "sufficient statistics" such as matched filter outputs. This may be easily accomplished as long as the higher AWGN level associated with a wide bandwidth does not swamp the model. That is, the CM structure of the interferer should be fairly dominant in order to utilize the inventive technique. If the jammer is very wideband compared to the desired signal, however, it may simply be filtered out and any Gaussian-like residue tolerated.

As mentioned earlier, the observation points or samples $y_k$ may, for example, be in the form of I/Q signal samples output from an analog-to-digital (ND) converter typically provided in an intermediate frequency (IF) stage of a communications receiver. Any residual jammer signal may then be treated effectively by classical filtering.

While a flat (nonselective) channel is preferable since any frequency selective condition may impact the CM property of the interferer, the recovered samples need not be temporally independent and identically distributed (i.i.d.). That is, only the first order distribution of the signals is important. It is assumed that the jammer is independent of the desired communications signal and noise, but even this is not essential to the detection process unless unrealistic knowledge of the desired signal is imputed to the jammer.

Moreover, there is no need to assume synchronism between the interferer and the desired signals. Provided the interferer samples retain a CM property, the composite received signal can be characterized by having its samples lie on circles centered on symbol points corresponding to each of the possible symbols produced by the desired communications signal. Assuming the receiver has knowledge of the modulation scheme used by the desired signal and can be synchronized to the signal, the receiver can operate to correlate each recovered observation point to one of the known possible signal symbols. In case the additive noise is significant, the correlation process can be made "soft" by using a known quality weighting technique wherein each of the finite number of possible symbols for the desired signal is given a metric.

While certain embodiments of the invention have been disclosed herein, it will be understood by those skilled in the art that various modifications and changes may be made without departing from the spirit and scope of the invention. Accordingly, the invention is not limited to any one embodiment and includes all such modifications and changes that lie within the breadth and scope of the following claims.

We claim:

1. A method of detecting a desired signal by a radio or receiver in a communications system, wherein the desired signal is modulated to obtain N possible symbols and is received in the presence of a constant modulus (CM) interferer that produces M possible symbols, including the steps of:

obtaining observation samples from a signal recovery stage in the receiver, the samples corresponding to the desired signal and the interferer as received simultaneously at the receiver;

defining N symbol points each corresponding to one of the N possible symbols modulated on the desired signal;

defining N observation constellations each having M constellation points corresponding to the M possible symbols produced by the interferer;

defining a circular observation perimeter for each observation constellation, wherein the perimeter includes the M constellation points of the constellation and has a radius corresponding to the strength of the interferer;

centering the observation perimeter of each of the N observation constellations on a corresponding one of the N defined symbol points;

for a given observation sample obtained from the signal recovery stage, determining on which observation perimeter lies a point that is nearest to the given observation sample; and selecting, for the given observation sample, the symbol point about which the determined observation perimeter is centered as a symbol of the desired signal.

2. A method according to claim 1, including performing the steps of the method mathematically with respect to a complex plane.

3. A method according to claim 1, wherein the step of obtaining observation samples is performed by sampling signals produced by an intermediate frequency (IF) stage in the receiver.

4. A method according to claim 3, including providing the signals produced by the IF stage in the form of in-phase/quadrature (I/Q) signals.

5. A method according to claim 1, wherein the desired signal is transmitted in the form of a phase shift keyed (PSK) digital communications signal.

6. A method according to claim 1, wherein the desired signal is transmitted in the form of a frequency shift keyed (FSK) digital communications signal.

7. A method according to claim 1, wherein the desired signal is transmitted in the form of a quadrature amplitude modulated (QAM) communications signal.

8. A method according to claim 1, wherein the desired signal is transmitted in the form of a digital communications signal capable of being mapped to discrete and distinct points in a complex (I/Q) plane.

9. A method according to claim 1, including receiving the desired signal at the receiver in the presence of an interfering signal the amplitude or envelope of which remains constant over time.

10. The method of claim 9, wherein the interfering signal is either an M-PSK or an M-FSK interferer wherein M is 2 or greater.

11. The method of claim 9, wherein the interfering signal is either an analog frequency modulated (FM) signal or a constant amplitude modulated (AM) tone signal.

12. A method according to claim 1, wherein the step of obtaining observation samples is performed synchronously with respect to the modulation of symbols on the desired signal.

13. A method according to claim 1, wherein the step of obtaining observation samples is performed in the absence of such filtering as would substantially alter the CM property of the interferer when defining the N observation constellations.

14. A communications receiver, comprising:
  a signal recovery stage constructed and arranged to produce successive composite observation samples each corresponding to a desired communications signal and a constant modulus (CM) interferer as received simultaneously at the receiver, wherein the desired signals are modulated to obtain N possible symbols, and the CM interferer produces M possible symbols; and
  a signal detection stage coupled to the recovery stage and including one or more signal processing stages configured and operative to:
  (a) define N symbol points each corresponding to one of the N possible symbols modulated on the desired signal;
  (b) define N observation constellations each having M constellation points corresponding to the M possible symbols produced by the interferer, the constellation points of each observation constellation defining a circular observation perimeter, wherein the perimeter includes the M constellation points of the constellation and has a radius corresponding to the strength of the interferer;
  (c) center the observation perimeter each of the N observation constellations on a corresponding one of the N defined symbol points;
  (d) for a given observation sample obtained from the signal recovery stage, determine on which observation perimeter lies a point that is nearest to the given observation sample; and
  (e) select, for the given observation sample, the symbol point about which the determined observation perimeter is centered as a symbol of the desired signal.

15. A receiver according to claim 14, wherein the signal recovery stage and the signal detection stage are constructed and configured to operate mathematically with respect to a complex plane.

16. A receiver according to claim 14, wherein the signal recovery stage includes an intermediate frequency (IF) stage constructed and arranged to produce the observation samples in the form of in-phase/quadrature (I/Q) signal samples.

17. A receiver according to claim 14, wherein the signal processing stages are configured and operative to detect the desired signal in the form of a phase shift keyed (PSK) digital communications signal.

18. A receiver according to claim 14, wherein the signal processing stages are configured and operative to detect the desired signal in the form of a frequency shift keyed (FSK) digital communications signal.

19. A receiver according to claim 14, wherein the signal processing stages are configured and operative to detect the desired signal in the form of a quadrature amplitude modulated (QAM) digital communications signal.

20. A receiver according to claim 14, wherein the signal processing stages are configured and operative to detect and output the desired communications signal in the presence of an interfering signal the amplitude or envelope of which remains constant over time.

21. A receiver according to claim 20, wherein the interfering signal is either an M-PSK or an M-FSK interferer wherein M is 2 or greater.

22. A receiver according to claim 20, wherein the interfering signal is either an analog frequency modulated (FM) signal or an amplitude modulated (AM) constant tone signal.

23. A receiver according to claim 14, wherein the signal recovery stage is constructed and arranged to produce the observation samples synchronously with respect to the modulation of symbols on the desired signal.

* * * * *